No. 802,011. PATENTED OCT. 17, 1905.
J. T. MOLTRUP.
MACHINE FOR TURNING CRANK SHAFTS OR SIMILAR ARTICLES.
APPLICATION FILED MAR. 19, 1904.
4 SHEETS—SHEET 1.
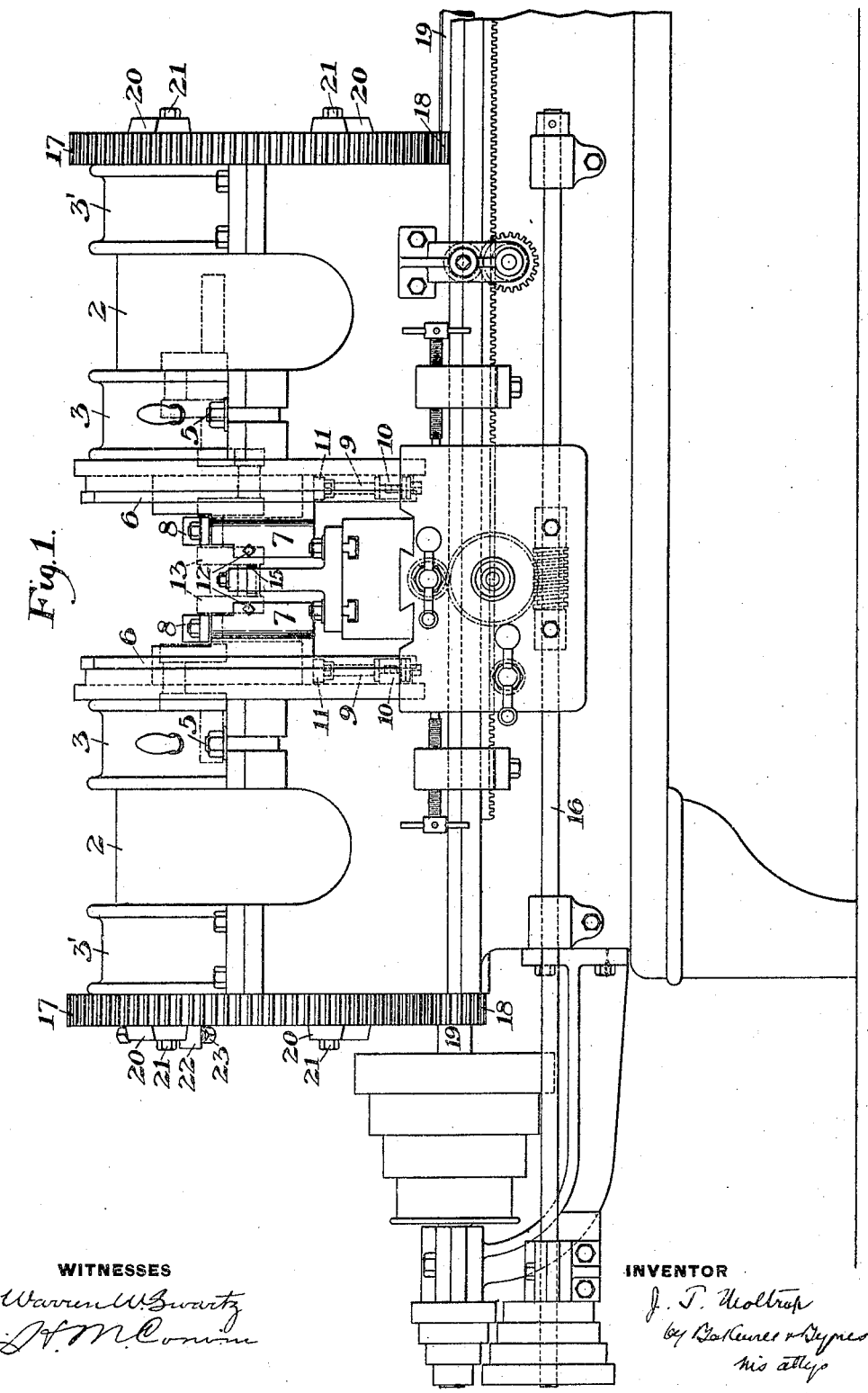
WITNESSES
INVENTOR

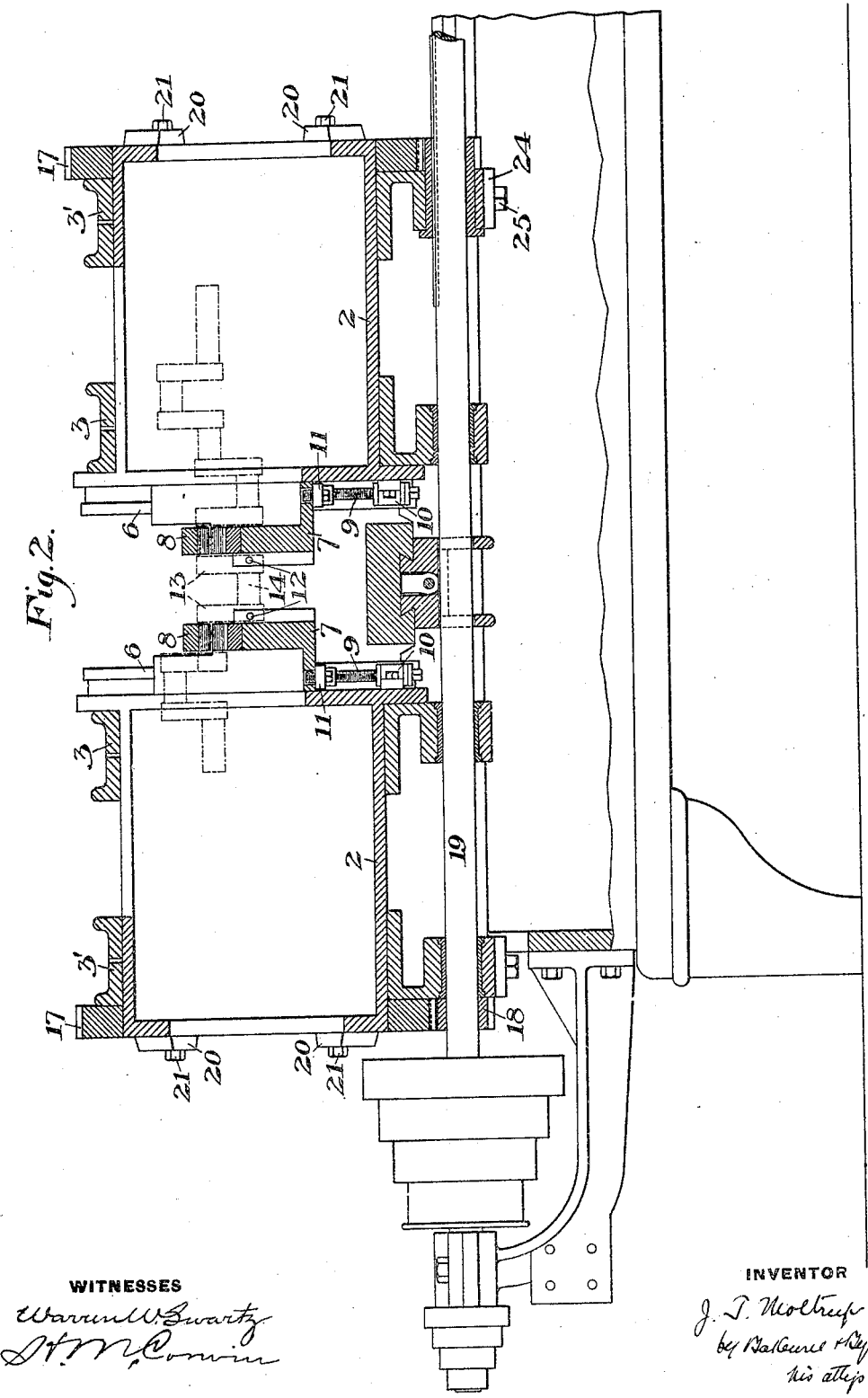

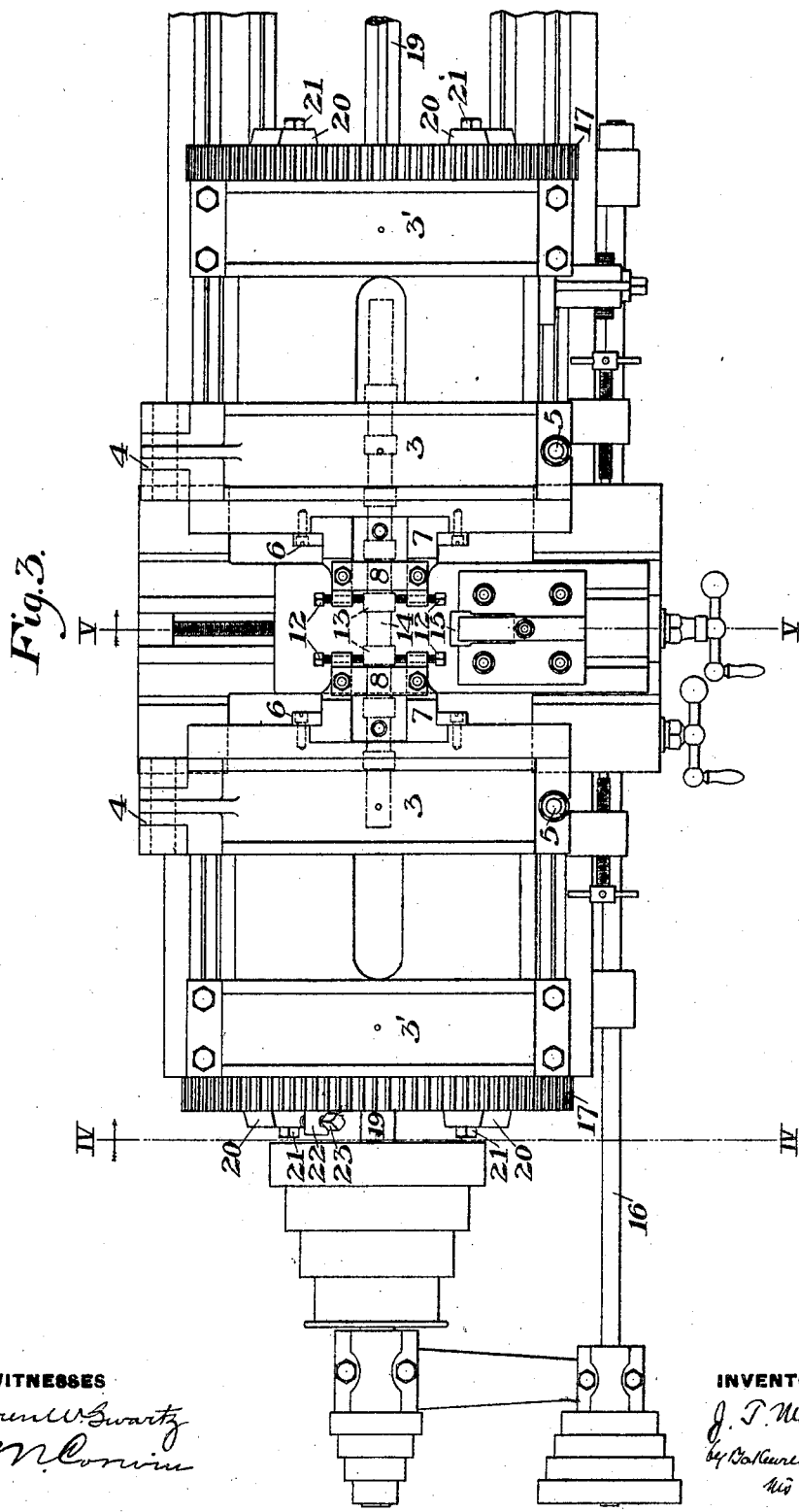

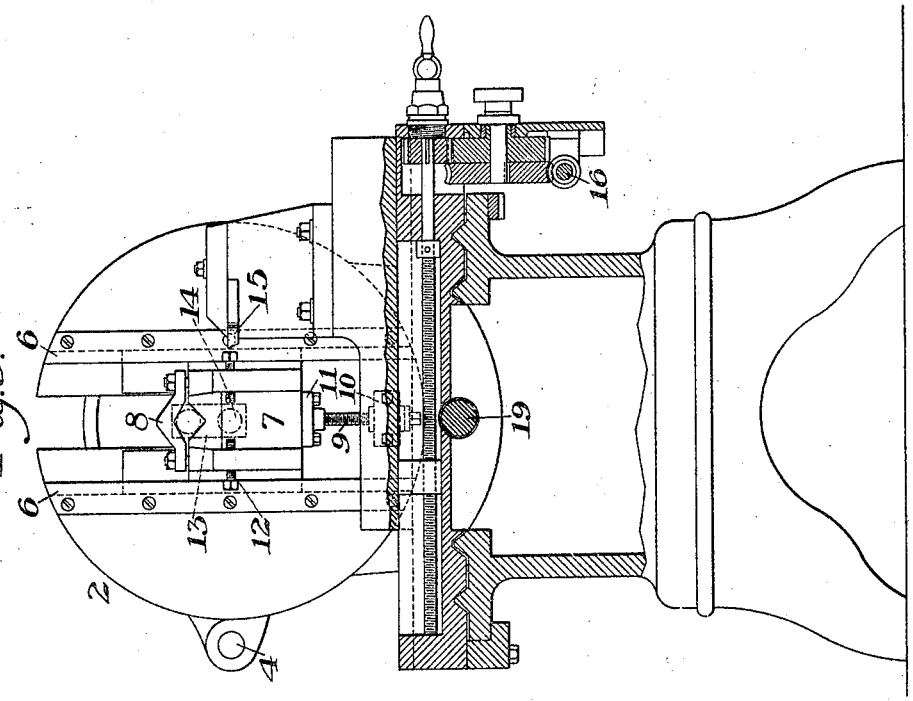
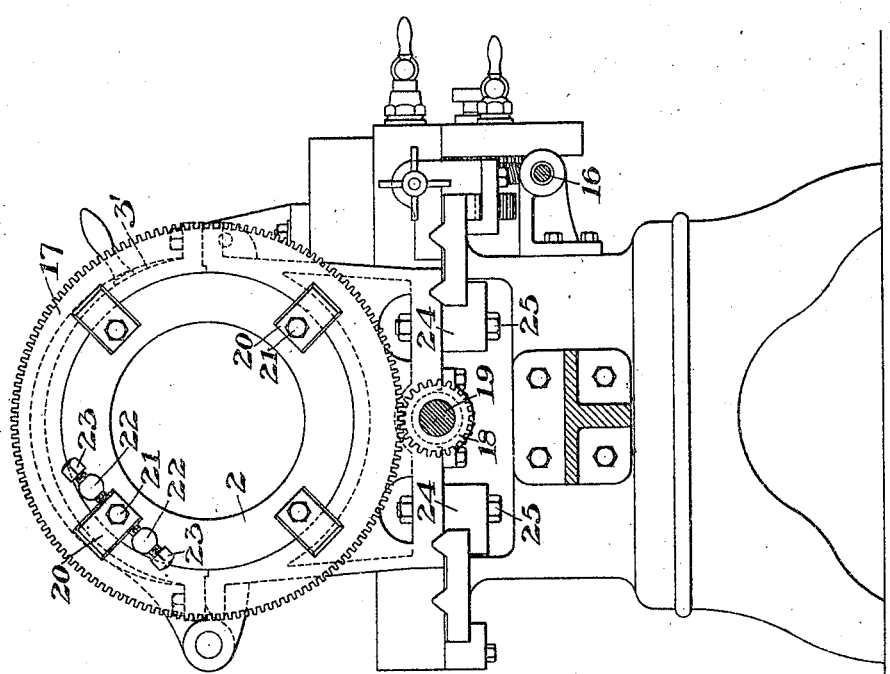

UNITED STATES PATENT OFFICE.

JAMES T. MOLTRUP, OF NEW BRIGHTON, PENNSYLVANIA.

MACHINE FOR TURNING CRANK-SHAFTS OR SIMILAR ARTICLES.

No. 802,011.  Specification of Letters Patent.  Patented Oct. 17, 1905.

Application filed March 19, 1904. Serial No. 198,896.

*To all whom it may concern:*

Be it known that I, JAMES T. MOLTRUP, of New Brighton, Beaver county, Pennsylvania, have invented a new and useful Machine for Turning Crank-Shafts or Similar Articles, of which the following is a full, clear, and exact description, reference being had to the accompanying drawings, forming part of this specification, in which—

Figure 1 is a front elevation of my improved apparatus in its preferred form. Fig. 2 is a longitudinal vertical section of the same. Fig. 3 is a top plan view. Fig. 4 is a cross-section on the line IV IV of Fig. 3 looking toward the right, and Fig. 5 is a cross-section on the line V V of Fig. 3 looking toward the right.

My invention relates to the turning of crank-shafts or similar articles, and is designed to provide an apparatus by which such articles may be rapidly and cheaply turned out. Heretofore in the turning of these crank-shafts the shaft portions have been gripped at one side of the axis of the crank and the turning-tool has been fed along from one end to the other of the crank-pin. This operation is a slow and expensive one, as is also the method of clamping and unclamping. My invention overcomes these difficulties and provides a machine in which a broad tool is preferably used without endwise feed, the tool being of a width equal the length of the pin. In giving rotary motion to the crank-pin I provide turning devices which engage the arm or arms of the crank-pin, thereby giving a positive turning motion and avoiding torsion, which would prevent the use of a broad tool.

The invention also consists in providing two drums in which the axle portions of the crank are inserted, these drums having driving-gears at least one of which is adjustable around its axis, so that by this adjustment the parts may be accurately alined, so that the motion of both arms of the crank will be uniform.

In the drawings, 2 2 represent a pair of hollow drums which are mounted in suitable end bearings 3 3' and having slots at one side, through which the crank-shaft may be inserted. The bearings 3 are made in two parts, the upper part being hinged at the back, as shown at 4, and preferably with a swing-bolt device 5 at its front, by which it may be locked or unlocked. In inserting the crank the two adjacent half-bearings are unlocked and thrown back and the crank-shaft dropped into place, the bearings then being swung down and locked. Each drum is provided at its inner end with a transverse guideway having side guides 6 6, engaging an adjustable chuck 7, having a removable top clamp 8. The upper and lower parts of the chuck are provided with jaws which clamp the portions of the crank-shaft between them, and to provide for cranks of different length of throw I provide adjusting means by which the chuck may be adjusted toward and from the center of the drum. In the form shown this consists of a screw 9, moving through a plain bearing 10, fixed to the inner face of the drum, extending through a nut 11, secured to the lower portion of the chuck. The screw has a squared lower end, by which it may be turned to adjust the chuck radially.

When the chucks have been adjusted for a certain length of crank-arm, a series of crank-shafts can be turned up without changing the adjustment. The chucks are of course adjusted so that when the crank-shaft is clamped the axis of the crank-pin will coincide with the axes of the drums.

To turn the crank-shaft with the drum, I provide each chuck with oppositely-extending set-screws 12, the chucks being provided with screw-threaded holes in their sides at different distances from the center to provide for cranks of different length of throw. These set-screws preferably engage the arms 13 of the crank at points opposite the ends of the crank-pin 14 which is to be turned. As the set-screws engage the outer ends of the crank-arms and the chucks engage the shaft portions at the centers of the drums, I thus get a long leverage on the arms for turning the shaft. In other words, the wrist-pin axis being in register with the axes of the drums the driving-power is applied to the crank-shaft portions at a distance away from the crank-pins equal to the length of the arms. This prevents torsional action on the crank-shaft and enables me to employ the wide tool shown at 15, by which the pin is turned without endwise travel of the tool. In this way I can turn the wrist-pin rapidly and obtain a large output. The tool 15 in addition to turning up the wrist-pin is also sharpened on its side edges, so as to be a true forming-tool. The side portions turn up the faces of the cheeks or arms of the crank at the same time that the wrist-pin is being turned. The tool is fed in during the turning operation by power connections through the shaft 16 and the ordinary connections to the tool-carrier. After one wrist-pin has been turned up the top members of the chucks are loosened, the set-screws released, and the crank-shaft is moved along and again dropped down into place, when the chucks and set-screws are tightened and the next crank-pin turned up.

To provide for accurate alinement of the two chucks, so that the power will be equally applied to both arms of the crank, I provide a means for adjusting one of the drums around its axis. Each drum is provided with a toothed wheel 17 at its outer end, which wheels engage pinions 18 upon the driving-shaft 19 of the machine. One of these toothed wheels 17 is adjustably secured to the outer end of its drum by lugs or brackets 20, having longitudinal slots and formed integrally with the gear-wheel. Cap-screws 21 extend through the lug-slots into holes in the end flange of the drum. The transverse slots in the lugs enable the drum to be adjusted slightly around its axis and relative to the wheel. To the end flange of the drum are secured two posts or lugs 22, through which extend set-screws 23, engaging the opposite side edges of one of the lugs 20. By loosening the four cap-bolts 21 and turning the screws 23 I adjust the drum relative to the wheel until the two chucks are accurately alined with each other. The cap-screws are then tightened and the parts are ready for use. One of the drums is mounted in bearings on a head-block 24, which is movable endwise along the end of the machine. This endwise movement of one drum enables the drums to be adjusted for different lengths of wrist-pins. After the drum is adjusted it is clamped in place by bolts 25.

In using my improved apparatus the drum-bearings are opened, the top members of the chucks removed, and the chucks having been radially adjusted to the correct position the crank-shaft is dropped into place. The chucks are then tightened together with their set-screws, the bearings swung down and locked, the tool properly adjusted, and the turning of the wrist-pin begun. As the pin rotates the wide tool is gradually moved in, thus turning the crank-pin and facing the cheeks or arms without any endwise motion of the tool. As soon as the turning is complete the chucks and set-screws are loosened, the crank-pin moved along and again dropped down, the chucks tightened, and the tool having been readjusted the operation is repeated.

The advantages of my invention result from the rapidity and accuracy of the turning operations. After the chucks have once been adjusted a number of crank-shafts of the same kind may be rapidly and accurately turned without interfering with the adjustments. The broad tool works rapidly and accurately and faces the cheeks at the same time that the wrist-pin is being turned. The peculiar manner of turning the shaft by engaging the arms gives me a leverage which enables the wide tool to be used. The rotary adjustment of the one drum enables the chucks to be accurately alined, so that all of the wrist-pins on the crank-shaft are in accurate alinement with each other after being turned. By using the long drums with the toothed wheel at their outer ends I can drop in the crank-shaft without interfering with the wheels, since they are always beyond the ends of the shaft.

Many variations may be made in the form and arrangement of the drums, chucks, feeding devices, tool, &c., without departing from my invention.

I claim—

1. A machine for turning crank-shafts or similar articles, comprising two drums slotted longitudinally from the inner ends and having holding-chucks at their inner ends, bearings for said drums, gear-wheels at the outer ends of the drums, and driving-gear intermeshing therewith; substantially as described.

2. A machine for turning crank-shafts or similar articles, comprising a pair of drums open at their inner ends and in endwise alinement, means for turning the drums simultaneously, and chucks at the inner ends of the drums having mechanism arranged to engage the arms of an intermediate crank; substantially as described.

In testimony whereof I have hereunto set my hand.

JAMES T. MOLTRUP.

Witnesses:
JOHN B. BARRATT,
R. S. BARTON.